Nov. 25, 1969    B. R. ABBOTT    3,480,166
CAR TOP CARRIER

Filed Jan. 29, 1968    2 Sheets-Sheet 1

INVENTOR.
BOBBY R. ABBOTT
BY
Robert K. Rhea
AGENT

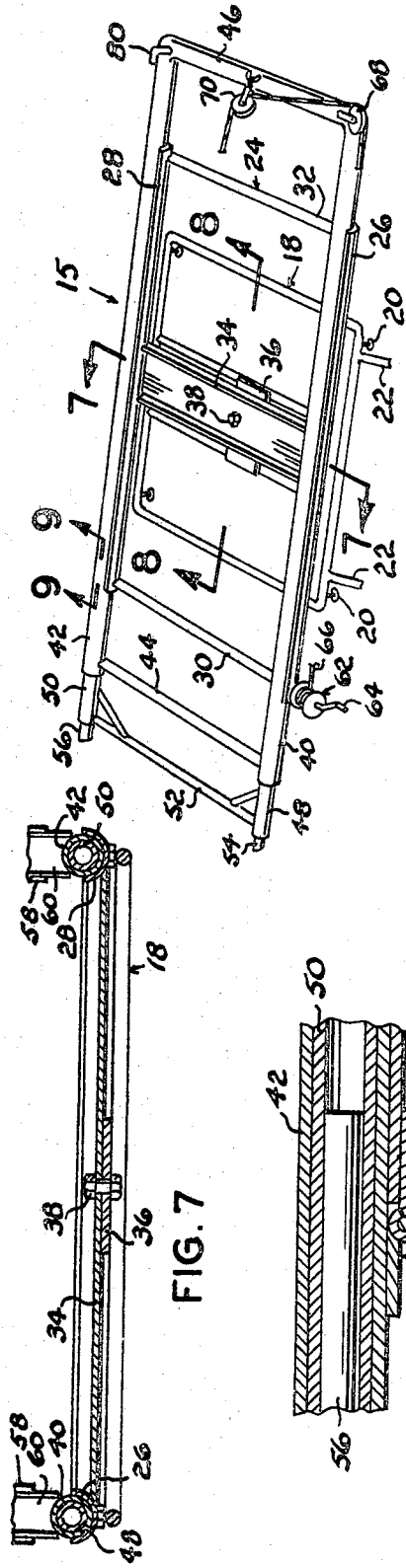

United States Patent Office 3,480,166
Patented Nov. 25, 1969

3,480,166
CAR TOP CARRIER
Bobby R. Abbott, 3808 SW. 40th Place,
Oklahoma City, Okla. 73119
Filed Jan. 29, 1968, Ser. No. 701,417
Int. Cl. B60r 9/00
U.S. Cl. 214—450      5 Claims

ABSTRACT OF THE DISCLOSURE

A rectangular base frame connected with an supported by an automative top centrally journals an upper frame for horizontal rotation about a vertical axis. The upper frame is hingedly connected at one side to a pair of spaced-apart tubular members which telescopingly receive a pair of pipes. The pipes are extended and their free ends are supported by the surface of the earth laterally of the car so that a manually operated winch loads equipment by pulling it up the incline formed by the telescoping members.

BACKGROUND OF THE INVENTION

The present invention relates to load handling and carrying means and more particularly to a car top carrier for transporting a folding camper.

One of the more popular types of camping equipment which provides protection from the weather comprises a wheel equipped rectangular trailer-like body having a hitch for towing behind a car. The body of this camper opens out and forms the base for a tent, however, many persons in addition to owning a camper of this class also own a boat which is normally pulled in trailer fashion behind the automobile. Thus in order to take both the camper and the boat on camping trips it becomes necessary to use two automobiles. It is, therefore, desirable to provide some means for transporting the folding camper on the top of the automobile.

The patents to Nelson, No. 2,756,140, and Jones, No. 3,128,89, each disclose car top carriers for loading and transporting a boat, however, the carrier of the Nelson patent is for a boat of relatively small dimensions and includes special rails having rollers which are not adaptable for the loading and unloading of a unit such as a camper. The Jones patent includes a special bracing or strut members which are required to be connected to or clamped to the chassis or frame portion of the automobile for supporting the boat carrying frame. My invention, on the other hand, uses a plurality of telescoping tubular members which are connected with a frame to extend laterally of a supporting automobile on an incline permitting ease in loading and unloading a wheel equipped camper.

SUMMARY OF THE INVENTION

A rectangular base frame is supported by a car top by connection with existing drip rails. The frame supports an support frame for horizontanl pivoting movement about a vertical axis. Spaced-apart parallel tubes are hingedly connected for vertical pivoting movement to one side of the frame. A pair of pipes are telescopingly received by this pair of tubes. The pipes are telescopingly extended and their free ends are pivoted towards and supported by the surface of the earth laterally of an automobile. These telescoping tubular members form a track for receiving the grooved periphery of wheels supporting the folding camper so that the camper may be progressively pulled upwardly along the tubes by a manually operated winch and cable mounted on the upper frame.

The principal object of this invention is to provide a simply constructed easily operated relatively small car top carrier for loading, unloading and transporting a grooved wheel equipped folding camping unit.

BRIEF DECRIPTION OF THE DRAWINGS

FIGURE 5 is a perspective view of the car top carrier per se, in traveling position;

Figure 1:
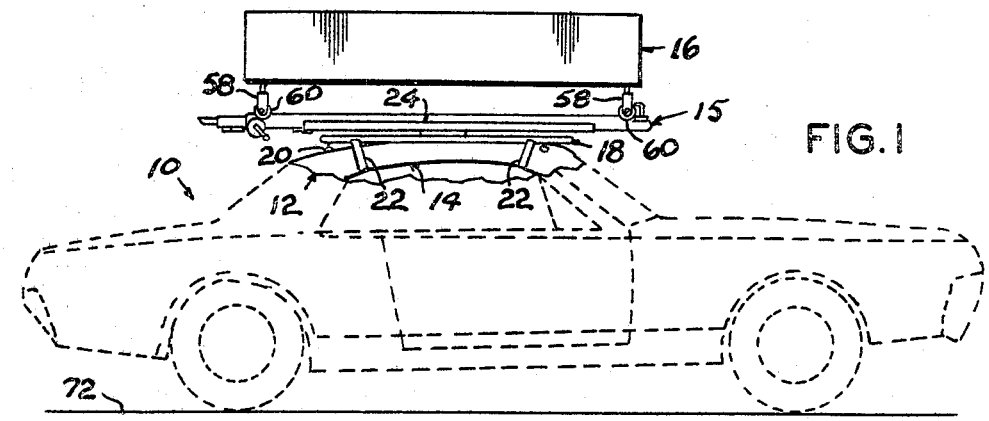
FIGURE 1 is a side elevational view of the device supporting a folding camper on the top of an automobile the remaining portion of the latter being shown by dotted lines.

FIGURE 6 is a perspective view of the car top carrier per se with the telescoping members extended and rotated 90°, from the position of FIG. 5, and pivoted for contact, at one end, with the surface of the earth to illustrate the loading and unloading position; and FIGURES 7, 8 and 9 are vertical cross-sectional views taken substantially along the lines 7—7, 8—8 and 9—9, respectively, of FIG. 5.

DESCRIPTION OF THE PREFERRED EMBODIMENT

Like characters of reference designate like parts in those figures of the drawings in which they occur.

In the drawings:

The reference numeral 10 indicates an automobile having a top portion 12 provided at its opposing sides with drip rails 14. The numeral 15 indicates the carrier per se which is connected with the car top 12 and supports a folding camper 16. The carrier 15 comprises a rectangular base frame 18 having overall dimensions slightly less than the dimensions of the car top 12 which is positioned above the top and provided with conventional suction cups 20 which support and stabilize the frame 18 on the top 12. The frame 18 is provided with straps 22 at its respective opposing sides which are connected in a conventional manner with the respective drip rail 14 to secure the frame 18 on the automobile. A second or upper frame 24 comprises a pair of spaced-apart parallel upwardly open, semi-circular in cross section, channel members or rails 26 and 28 which are interconnected at their respective end portions by cross members 30 and 32. A channel member, having its legs disposed upwardly, extends between and is secured at its respective ends to the support rails 26 and 28, medially their ends, to form a beam 34. A plate 36, mounted on intermediate cross members of the base frame 18, forms a bolster which is cooperatively drilled with the beam 34 for receiving a bolt 38 forming a vertical axis permitting horizontal pivoting movement of the upper frame 24. The rails 26 and 28 respectively support a pair of elongated tubes 40 and 42 interconnected at their respective end portions by cross members 44 and 46. The tubes 40 and 42 extend beyond the respective end portions of the rails 26 and 28, a distance great enough to receive and support the folding camper 16 in the manner hereinafter described.

Adjacent one end portion, for example near the cross brace 44, the tubes 40 and 42 are hingedly connected, by strap hinges 46 (FIG. 9). to the respective end portion of the rails 26 and 28 so that the tubes 40 and 42 may pivot vertically about the horizontal axis formed by the hinge pins 47.

A pair of pipes 48 and 50 are rigidly interconnected at one end portion by a brace 52 and have their other end portions telescopically received, respectively, by the tubes 40 and 42. A pair of rods 54 and 56 are telescopingly received by the outwardly projecting end portions of the pipes 48 and 50.

The camper 16 is substantially rectangular in general configuration and is provided with caster-like supports 58 which are secured to the depending surface of the respective corner portions of the camper in depending relation. Each of the casters 58 is provided with a wheel 60 having a grooved periphery which cooperatively receives a peripheral portion of the respective tubes 40 and 42, pipes 48 and 50 and rods 54 and 56 for supporting the camper while transporting the latter and in loading and unloading the camper as hereinafter explained.

A hand operated winch 62 is secured to one of the rails, for example the rail 26, adjacent its hinge connection with the pipe 40. The winch is provided with a handle 64 and a length of cable 66. The cable extends toward the opposite end of the device 15 and is entrained around a suitable pulley 68 and pivoting block 70 for connection with the forward end portion of the camper 16.

OPERATION

Figure 4:
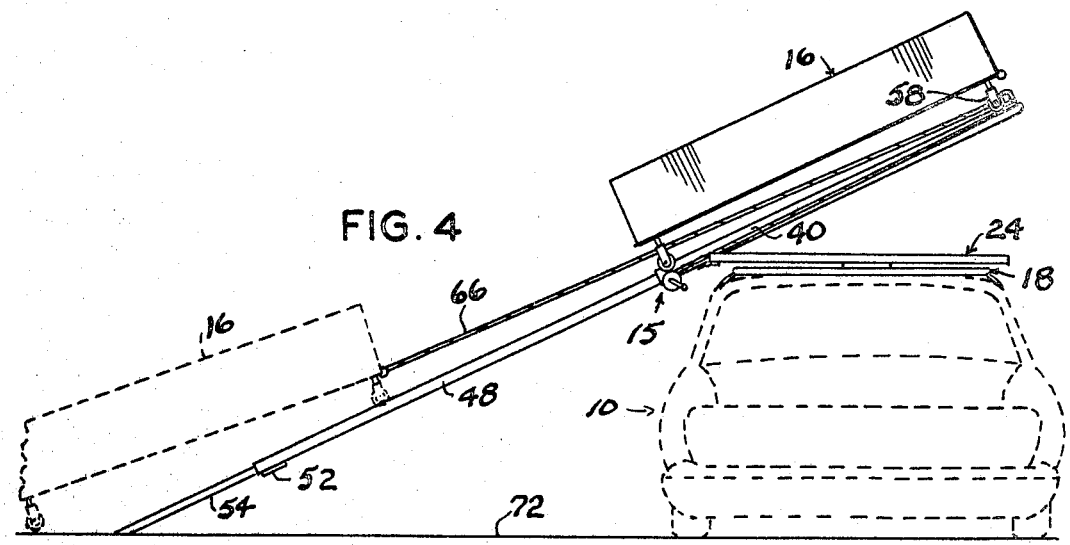
FIGURE 4 is a view similar to FIG. 3 illustrating the tilted or angular position of the extended telescoping members when loading and unloading the folding camper.
Figure 3:
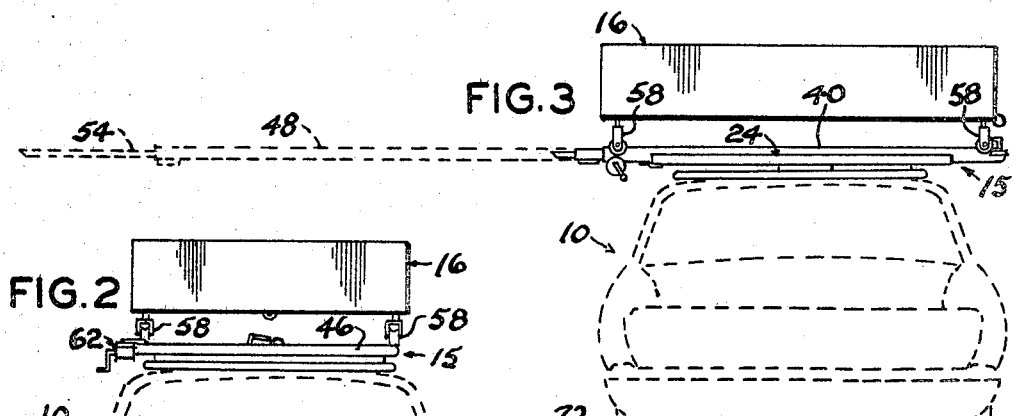
FIGURE 3 is a view similar to FIG. 2 with the camping unit and a portion of the carrier rotated 90° from its position of FIG. 2 and illustrating, by dotted lines, the extended position of the telescoping members.
Figure 2:
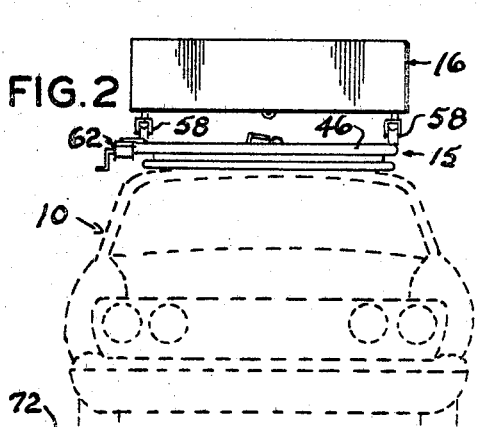
FIGURES 2 is a right end view of FIG. 1.

Operation of the carrier will be easily understood from the following description of loading the camper 16. The device 15 is first installed on the car top 12 as described hereinabove. The upper frame 24 and supported telescoping members are pivoted about the vertical axis of the bolt 38 so that the free ends of the pipes 48 and 50 project laterally of the car 10. The pipes 48 and 50 and rods 54 and 56 are extended, as shown by dotted lines in FIG. 3, and tilted so that the free ends of the rods contact the surface of the earth, indicated by the line 72 (FIG. 4). The camper 16 is manually positioned adjacent the rods 54 and 56 so that the respective caster wheels 60 are aligned with the rods. The cable 66 is connected to the forward end of the camper 16 and the winch 62 operated to pull the camper up the incline formed by the telescoping members. A stop 80, on the tube 42 limits movement of the carrier when in final loaded position. The length of the tubes 40 and 42 and telescopingly received members 48–50 and 54–56, with respect to the vertical height of the car 10, is such that the angle formed by the telescopingly extended members, with respect to the surface of the earth, is approximately 25°. When the camper 16 reaches the solid line position of FIG. 4, the telescoping members and the camper may be tilted to the horizontal position shown by FIG. 3 and locked in this position by any suitable means, not shown. The extended telescoping members 54–56 and 48–50 are then telescoped into the tubes 40 and 42. The camper 16, rails 26–28 and supported telescoping members are then rotated about the vertical axis formed by the bolt 38 to position the camper and the rails in longitudinal alignment with the car 10, as shown by FIGS. 1 and 2, and is secured in this position against unauthorized rotation.

Unloading the camper 16 is accomplished by substantially reversing the above procedure and briefly stated comprises, releasing the upper frame 24 so that it may be pivoted while supporting the camper 16 so that the free ends of the rods 54–56 project laterally of the supporting car 10. The rods 54–56 and pipes 48–50 are then extended and tilted for contact, by the free end portions of the rods 54–56, with the surface of the earth 72 wherein unwinding the cable 66 from the hand winch 62 permits the camper 16 to roll by gravity down the incline of the telescoping members.

Obviously the invention is susceptible to some change or alteration without defeating its practicability, and I therefore do not wish to be confined to the preferred embodiment shown in the drawings and described herein.

I claim:

1. The combination with a folding camper and an automobile, said automobile having a top, of a carrier for loading, unloading and transporting said camper, said carrier comprising: a base frame having means rigidly connecting it to said top; an upper frame overlying said base frame; means interconnecting said base frame with said upper frame for horizontal pivoting movement of the latter, means comprising a bolster and a beam connected, respectively, with said base frame and said upper frame, and a bolt extending vertically through said bolster and said beam; and folding camper supporting track means connected with said upper frame, the opposing side members of said upper frame each comprising an upwardly open channel member for supporting said track means.

2. Structure as specified in claim 1 in which said track means comprises: a pair of tubes interconnected at one end and hingedly connected for vertical pivoting movement, adjacent their other ends with said channel members.

3. Structure as specified in claim 2 and telescoping members telescopically received respectively by said tubes.

4. Structure as specified in claim 3 in which said folding camper is provided with caster-like supports each having a grooved wheel cooperatively engaging said track means.

5. Structure as specified in claim 4 and winch and cable means mounted on one said frame for controlling the movement of said folding camper along said track means.

References Cited

UNITED STATES PATENTS

| 2,551,351 | 5/1951 | Swenson | 214—450 |
| 2,568,628 | 9/1951 | Herring | 214—450 |
| 3,169,653 | 2/1965 | Stromberg | 214—450 |
| 3,186,569 | 6/1965 | Roux | 214—450 |
| 3,282,455 | 11/1966 | Demarais | 214—450 |

HUGO O. SCHULZ, Primary Examiner

U.S. Cl. X.R.

214—85.1